US008644150B2

(12) United States Patent
Sassi et al.

(10) Patent No.: US 8,644,150 B2
(45) Date of Patent: Feb. 4, 2014

(54) ADMISSION CONTROL IN A TELECOMMUNICATION NETWORK

(75) Inventors: Massimo Sassi, Turin (IT); Angelo Garofalo, Turin (IT); Alessandro Faure Ragani, Turin (IT); Alessandro Michele Aiello, Turin (IT); Vinicio Vercellone, Turin (IT)

(73) Assignee: Telecom Italia S.p.A., Milan (IT)

( * ) Notice: Subject to any disclaimer, the term of this patent is extended or adjusted under 35 U.S.C. 154(b) by 956 days.

(21) Appl. No.: 11/794,470

(22) PCT Filed: Dec. 30, 2004

(86) PCT No.: PCT/EP2004/053734
§ 371 (c)(1),
(2), (4) Date: Nov. 17, 2009

(87) PCT Pub. No.: WO2006/069606
PCT Pub. Date: Jul. 6, 2006

(65) Prior Publication Data
US 2010/0309785 A1    Dec. 9, 2010

(51) Int. Cl.
*H04L 12/26*    (2006.01)

(52) U.S. Cl.
USPC .......................................................... 370/232

(58) Field of Classification Search
USPC ........................................ 370/232, 230, 231
See application file for complete search history.

(56) References Cited

U.S. PATENT DOCUMENTS

| 5,968,176 | A | * | 10/1999 | Nessett et al. | 726/11 |
| 6,154,839 | A | * | 11/2000 | Arrow et al. | 713/154 |
| 7,327,675 | B1 | * | 2/2008 | Goode | 370/230 |
| 7,580,792 | B1 | * | 8/2009 | Croak et al. | 701/209 |
| 7,660,243 | B2 | * | 2/2010 | Houck et al. | 370/230 |
| 7,684,322 | B2 | * | 3/2010 | Sand et al. | 370/230 |
| 7,835,344 | B1 | * | 11/2010 | Bartholomew et al. | 370/352 |

FOREIGN PATENT DOCUMENTS

WO    WO 2004/102896 A2    11/2004

OTHER PUBLICATIONS

Dimopoulou, et al., "On Providing a Dynamic QoS Management System for IP Networks", Proceedings of 10th International Conference on Software, Telecommunications and Computer Networks (SoftCOM 2002), Split & Dubrovnik (Croatia), Ancona & Venice (Italy), 5 pages, (2002).

* cited by examiner

*Primary Examiner* — Mark Rinehart
*Assistant Examiner* — Mohammad Anwar
(74) *Attorney, Agent, or Firm* — Finnegan, Henderson, Farabow, Garrett & Dunner, L.L.P.

(57) ABSTRACT

A method and system for performing admission control in a packet-based telecommunication network includes a backbone network coupled between at least two access networks. When a first user on a first access network wants to communicate with a second user located on a different access network, a request is made to a quality server whether network resources are available. The quality server separately monitors both access networks and the backbone network and determines whether network resources are available to satisfy the request. In one embodiment, a two-tier approach is used wherein a coordinator module interacts with an admission control subsystem including a plurality of subsystem modules. Each admission control subsystem module is responsible for monitoring a part of the network, such as, one access network or a backbone network. The coordinator module determines which subsystem modules are associated with the user request and interrogates such subsystem modules as to resource availability.

16 Claims, 11 Drawing Sheets

ADMISSION CONTROL IN A TELECOMMUNICATION NETWORK

CROSS REFERENCE TO RELATED APPLICATION

This application is a national phase application based on PCT/EP2004/053734, filed Dec. 30, 2004.

TECHNICAL FIELD OF THE INVENTION

The present invention relates generally to telecommunication networks, and, more particularly, to admission control operations to control quality-of-service (QoS) in a packet-based telecommunication network.

BACKGROUND ART

In a rapidly changing telecommunications marketplace, companies can capitalize on the growing opportunities by introducing value-added services to customers seeking more reliable and economical telecommunications services. The tremendous growth in network infrastructure and corresponding growth in Internet Protocol (IP) traffic has resulted in the use of IP as a platform for new telecommunications services that take advantage of voice and data convergence. Examples of new services include video communications, Voice over IP (VoIP), video/audio conferencing, video-on-demand, on-line gaming, etc.

Because of such growth, Quality-of-Service (QoS) is becoming increasingly important to ensure high-quality transport within the network infrastructure, which includes monitoring one or more of the following:

Service availability, such as the reliability of the user's connection to the Internet Service.
Delay (also called latency), such as the time interval between transmitting and receiving packets.
Delay variation or jitter, which refers to the variation in time duration between all packets in a stream taking the same route.
Throughput, which is the average or peak rate at which packets are transmitted.
Packet loss rate resulting from congestion that is the maximum rate at which packets can be discarded during transfer through a network.

Figure 1:
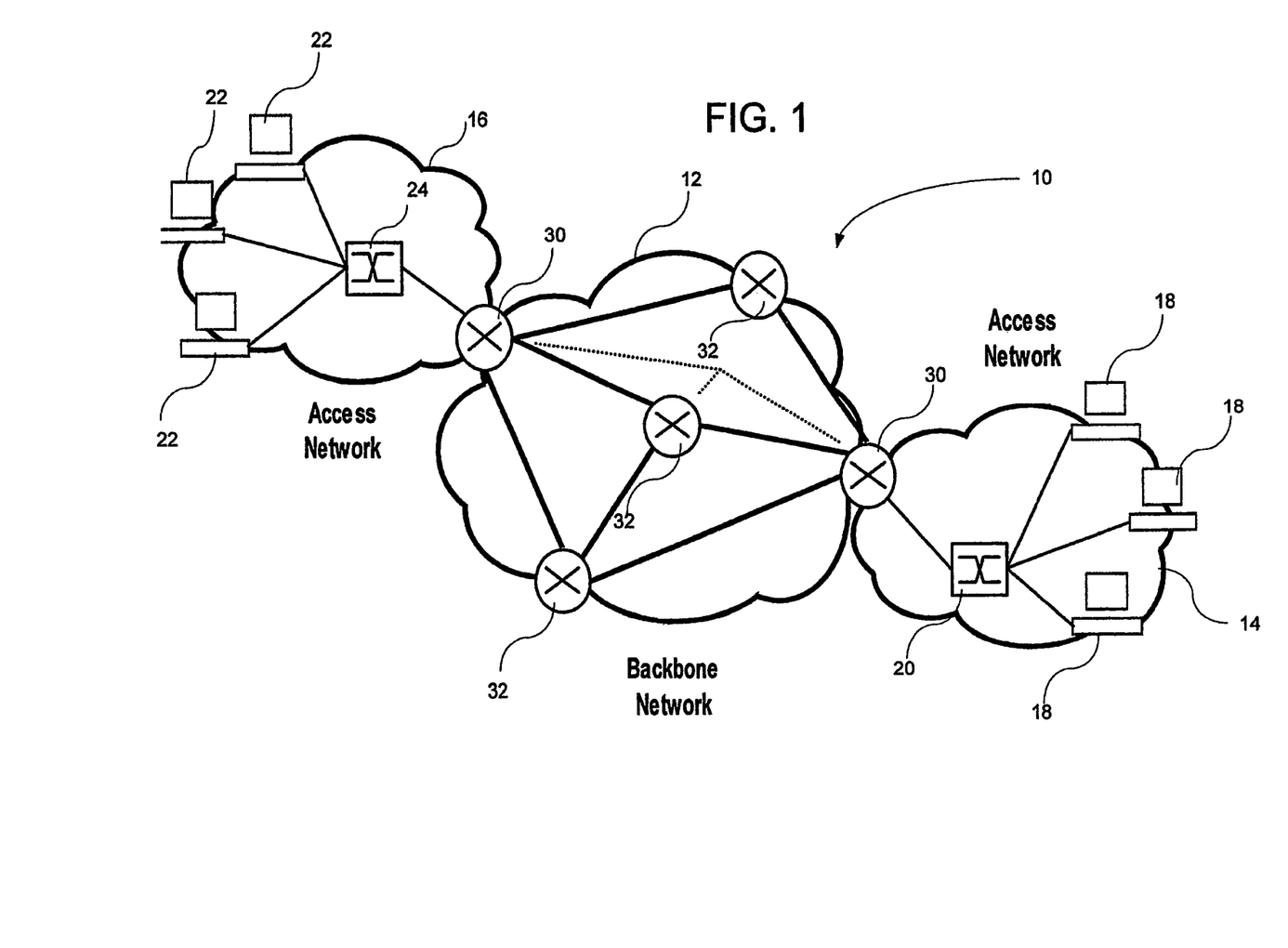
FIG. 1 is a diagram of a telecommunications network including at least two access networks connected through a backbone network.

FIG. 1 shows an example of a packet-based telecommunication network 10, which in this case is an IP network. The IP network of a generic telecommunication Service Provider (SP) typically includes a backbone network 12 connecting together two or more access networks, such as shown at 14, 16. Access network 14 is generally made of layer 1- or layer 2-type access/aggregation nodes 20, connecting a number of subscribers 18. Through the above access network, a subscriber can communicate with other subscribers on the same access network or gain access to the backbone network for communications outside the local area. The subscribers 18 (also generically called "users" hereafter) can take a variety of forms including a single home user, a company with one or more networks, a generic network device (e.g. application or content server), etc. Likewise, access network 16 has subscribers 22 and an access node 24. The access/aggregation nodes 20, 24 may use different technologies to connect the subscribers, such as SDH/Sonet, WDM, Ethernet, Frame Relay, xDSL, etc. Additionally, the above access/aggregation nodes 20, 24 may be provided by different vendors. The access/aggregation nodes 20, 24 communicate with the backbone network 12 through edge routers 30. The backbone network 12 includes a plurality of core routers 32, for providing routing paths generally used in long-distance communication. Both edge and core routers are generally layer 3-type devices.

FIG. 1 is a simplified illustration wherein only a small number of edge routers 30 and core routers 32 are shown, but the backbone network is generally a nationwide network and may include many thousands of core and edge routers. Similarly, although only two access networks 14, 16 are shown, there generally are many access networks connected to the backbone 12 in the IP network 10.

There are a number of known techniques for handling QoS in an IP network IP networks are traditionally based on a best effort approach for delivery of packets, wherein all transmissions or "flows" across the network are treated independently of their characteristics (e.g., source/destination pair, application, etc.). But this solution is insufficient for real-time applications, such as remote video, multimedia conferencing, visualization, and virtual reality. Before such real-time applications can be broadly used, the Internet infrastructure has to evolve in order to support QoS functionality, which provides some control over the main quality parameters (such as throughput, end-to-end packet delays, jitter, etc.).

One proposed solution to this problem is the Integrated Services (IntServ) model, which uses a Resource Reservation Protocol (RSVP) to check and reserve the necessary resources along the path of IP nodes between the source and destination. However, this solution has both quality control problems and scaling issues. For example, one quality control problem is that the source computer can request directly to the IP nodes whatever resources it desires. As a result, a subscriber can take direct control of resource allocation over the ISP network. The RSVP protocol also has scaling issues because the routers must store state information for each flow. Thus, the amount of state information increases proportionally with the number of flows placing a huge storage and processing overhead on the routers.

Another solution is called Differentiated Services (Diff-Serv). DiffServ is based on a classification of the flows that enter the network. Based on that classification, each packet is marked with a code that defines the class to which it belongs. On each network node, a policy called PHB (Per Hop Behaviour) is defined for each class, specifying the treatment experienced by all packets belonging to that class that cross the node. In order to support QoS guarantees with DiffServ, it is necessary to guarantee that the total amount of traffic injected for each class does not exceed the available resources. As an extension to the basic DiffServ model, centralized agents called bandwidth brokers that receive user requests and that manage the allocation of network resources have been proposed. The bandwidth brokers authenticate the requestor's credentials, check the availability of network resources, update the resource databases, and configure the network nodes to setup the communication. Although the DiffServ solution solves some of the problems with scalability and performance, it is focused on solving problems for backbone networks, rather than access networks. Access networks present peculiar characteristics, as they may differ from backbone networks, in terms of topology and technology. As a result, the DiffServ solution with bandwidth brokers is not optimized for the resource modelling and admission control in access networks.

Moreover, access areas can be significantly different also from each other in terms of implementation technology (xDSL, ATM, GBE, etc.). Each implementation technology has its own characteristics, which make it difficult to create an architecture according to all the parameters necessary for admission control (bandwidth, interfaces, etc.). Additionally, the different technologies create problems tracking allocated and available resources. Unlike in a backbone network, configuration normally takes place on parameters more closely tied to physical aspects than to the TCP/IP world.

Another solution uses MPLS Traffic Engineering (MPLS-TE) techniques. These techniques expect that traffic routing on the network can be controlled by creating virtual circuits, known as TE-tunnels, and setting-up predetermined paths while taking into account any assigned bandwidth limitations. The allocation of resources needed to satisfy the QoS requirements is thus implicit in the creation of the TE-tunnels. Like the DiffServ solution, the MPLS-TE solution does not adapt well to access networks. Additionally, this solution works well for traffic transported on the TE tunnels, but it is ineffective for establishing guarantees for the remaining part of the traffic routed using the normal procedures provided by the IP protocol.

A specific solution, inspired to a DiffServ model with bandwidth brokers, called QMTool, is proposed in a paper called "*On providing a Dynamic QoS Management system for IP Networks*", by L. Dimopoulou et al., *Proceedings of 10th International Conference on Software, Telecommunications and Computer Networks* (*SoftCOM* 2002), Split & Dubrovnik (Croatia), Ancona & Venice (Italy), Oct. 8-11, 2002, which describes a platform independent of the underlying technologies or vendor-specific equipment. A three-layer approach is described. The lower layer is responsible for the direct communication with managed objects (e.g. routers, workstations, servers). The second layer processes the data provided by the lower layer. Finally, the upper layer serves as a front-end tool facilitating the interaction with a network operator. A Resource Control Layer (RCL) is used as a distributed bandwidth broker and includes a Resource Control Agent (RCA), an Admission Control Agent (ACA) and the End-User Application Toolkit (EAT). The RCA is mainly responsible for the management of network resources within an administrative domain. The ACA is mainly responsible for user authentication and authorization, reservation handling, and flow admission control. The EAT forwards reservation requests from the users to the ACA.

The Applicant observes that, like the shortcomings of other QoS technologies, the QMTool does not provide admission control over the access networks. Instead the focus of admission control is only on the backbone network. However, as already described, management of backbone networks is very different from management of access networks, which can impact resource modelling and admission control.

The Applicant has thus noticed that prior art lacks a solution for allowing adequate QoS control over an end-to-end transmission in a packet-based telecommunications network. In particular, The Applicant has noticed that the prior art lacks an adequate solution that provides admission control covering both the backbone network and the access networks.

OBJECT AND SUMMARY OF ME INVENTION

The present invention therefore provides a method and system for performing admission control in a packet-based network, such as an IP network, that overcomes the shortcomings of the prior art.

In accordance with one aspect of the present invention, there is provided a method of performing admission control in a packet-based telecommunication network (10) including a backbone network (12) and at least a first and a second access networks (14,16) connected to the backbone network (12), each of said backbone and access networks having associated a respective admission control module (74), the method comprising the steps of:

receiving a request (90) from a first user of the first access network to connect with a second user of the second access network;

determining (100, 102), after the step of receiving, the admission control modules associated with the first and second access networks; and requesting, after the step of determining, the admission control modules associated with the first and second access networks and, if the first and second access networks are separate access networks, the admission control module associated with the backbone network, to check (104) the availability of connection resources for establishing a connection between the first and the second user.

In another aspect of the present invention, there is provided a system for performing admission control in a packet-based telecommunication network (10) including a backbone network (12) coupled between at least first and second access networks (14, 16) and a backbone network (12) coupled between the first and second access networks, the system characterized by:

an admission control coordinator module (70) configured to receive a request from a first user on the first access network (14) to connect to a second user on the second access network (16); and at least three admission control subsystem modules (74) coupled to the admission control coordinator module (70), a first of the admission control subsystem modules (AC N) configured to monitor the first access network (14), a second of the admission control subsystem modules (AC J) configured to monitor the second access network (16), and a third of the admission control subsystem modules (AC bb) configured to monitor the backbone network (12).

In one preferred embodiment of the present invention, each local-topology database (76) may store information associated with a configuration of its associated access network or backbone network.

According to the method of the present invention, in a network including a backbone network and a plurality of access networks, the network server receives from a first user a request for connection with a second user; the server, basing on the information contained in the request, identifies the access networks related to the two users and requests the Admission Control modules of the backbone network and of the two access networks to check availability of connection resources in the respective areas by consulting respective databases; if the connection resources are available, the connection between the first and second users is set up.

Accordingly, a two-tier approach is used to separately monitor both access networks and the backbone network and determine whether network resources are available to satisfy the request.

In this two-tier approach, a coordinator module interacts with an admission control subsystem including a plurality of subsystem modules. Each admission control subsystem module is responsible for monitoring a part of the network, such as one access network or a backbone network. The coordinator module determines which subsystem modules are associated with the user request and interrogates such subsystem modules as to resource availability. Each subsystem module makes a determination whether the user request can be satisfied for its respective network portion and returns a positive or negative response to the coordinator module based on the network capacity and allocated resources. The coordinator module then responds to the user request with the appropriate response.

The two-tier approach is readily scalable as additional admission control subsystem modules can be easily added for new access networks. Scalability is further achieved because each admission control subsystem module needs only to monitor one access network or one backbone network. Additionally, the coordinator module may remain divorced of knowledge about the access and backbone networks.

For determining which admission control subsystems to use, the coordinator module may access a database that is not necessarily part of the quality server. For example, a SP may typically provide and maintain, for different purposes (e.g. service provisioning, network inventory, etc.) such a database. This will include information about the access area and the logical connection identifiers (respectively referred in the following as the area code and connection ID) associated with subscribers on the network. By using such a database, the overhead associated with the quality server is reduced.

The admission control method of the present invention may apply on traffic flows which use IP and both MPLS and MPLS-TE at the same time.

BRIEF DESCRIPTION OF THE DRAWINGS

For a better understanding of the present invention, a preferred embodiment, which is intended purely by way of example and is not to be construed as limiting, will now be described with reference to the attached drawings, wherein.

DETAILED DESCRIPTION OF PREFERRED EMBODIMENTS OF THE INVENTION

Figure 2:
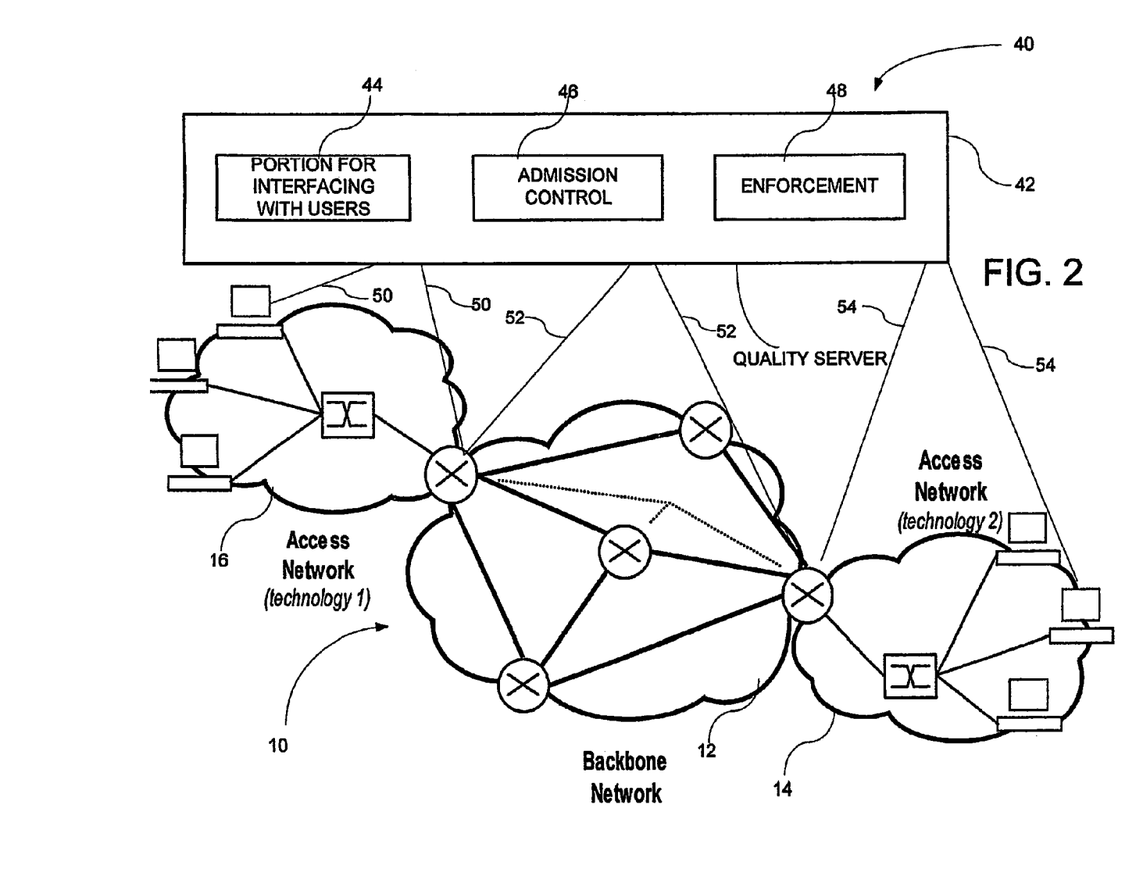
FIG. 2 is a block diagram of a quality server according to the invention for controlling QoS on the access and backbone networks of FIG. 1.

Referring to FIG. 2, a system 40 is shown having a quality server 42 with a portion 44 for interfacing with users (e.g., physical persons, devices, networks etc.), an admission control portion 46, and an enforcement portion 48. The portion 44 receives a user request to connect a first user on a first access network with a second user on a second access network. Note that in case the two users are connected to the same access network, the procedures described herein will still apply, where the first and second access network coincide. The admission control portion 46 separately monitors each of the access networks 14, 16 and the backbone network 12 (as indicated at 50, 52, and 54) and is responsible for determining whether sufficient resources are available to handle the user's request. If sufficient resources are available, the admission control portion 46 sends a positive response to the portion 44 for communicating the result to the user and signals the enforcement portion 48. In response, the enforcement portion 48 configures the involved elements in the network 10. The user interface portion 44 and the enforcement portion 48 can be accomplished using a number of well-known techniques and will be discussed only briefly. Rather, the focus of the present application is on the admission control portion 46.

Figure 3:
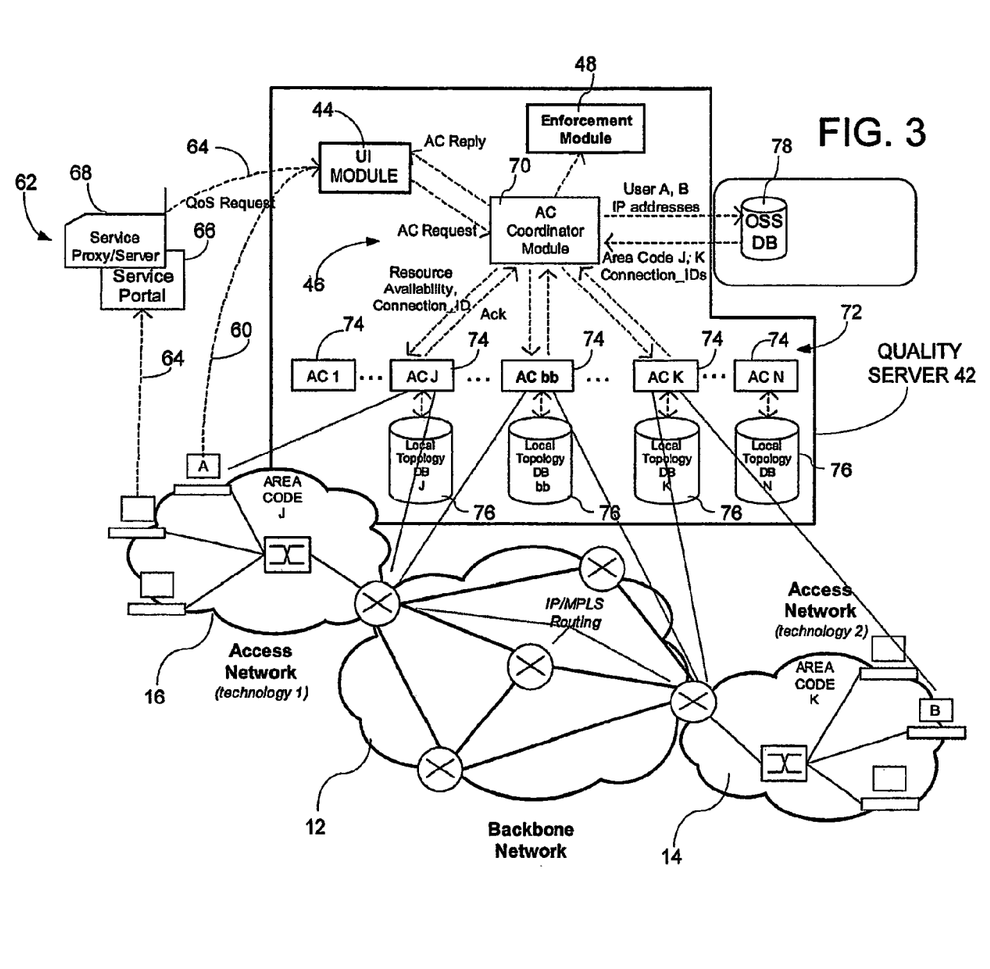
FIG. 3 is a detailed exemplary system showing the quality server of FIG. 2 as a two-layer approach having a coordinator module controlling an admission control subsystem.

FIG. 3 shows an example of the quality server 42 in detail. The portion 44 for interfacing with users is shown as a user interface (UI) module and can receive user requests either directly as shown at 60 or indirectly through intermediate elements 62, as shown by path 64. The intermediate elements may take a variety of forms but are shown in this example as a service portal 66 and a service proxy/server 68.

The enforcement portion 48 can use a variety of well-known protocols for configuring the access networks 14, 16 and the backbone network 12. For example, known solutions typically adopt a policy-based model that enables communication with the network apparatuses by means of COPS (Common Open Policy Service) protocol or other methods, such as SNMP (Simple Network Management Protocol), XML (Extensible Markup Language), etc.

The admission control (AC) portion 46 is shown as a two-tier approach including an admission control (AC) coordinator module 70 and an admission control (AC) subsystem 72. The subsystem 72 includes a plurality of admission control (AC) subsystem modules 74 labelled as AC 1 through AC N (where N corresponds to the number of access networks). The modules AC 1 through N are used for monitoring the access networks in a one-to-one correspondence. The subsystem 72 also includes an AC bb module used for monitoring the backbone network. Note also that, for scalability issues, such a backbone network may be formed by a plurality of admission control domains, each of them managed by an associated AC subsystem. Each admission control subsystem module 74 has an associated local topology database, shown generally at 76. Thus, one admission control module 74 in conjunction with its associated local topology database 76 monitors one access network or the backbone network. For example admission control module AC J is shown as the monitor of access network 16 and admission control module AC K is shown as the monitor for access network 14. Thus, the local topology database J, associated with admission control module AC J, has data stored therein associated with the configuration of the access network 16, such as links, devices, ports, cards, etc. Likewise, the local topology database K, associated with admission control module AC K, has data stored therein associated with access network 14. Additionally, local topology database bb, associated with the admission control module AC bb, has data stored therein associated with the backbone network 12. The local topology databases 76 are consulted by the admission control subsystem modules 74 in order to determine the availability of resources within their own area of competence. The databases 76 can be populated via manual operations or by means of automated operations (e.g., dynamic "topology discovery").

An area code database 78, indicated as OSS DB, may be a part of the quality server 42 or it may be associated with a different entity. For example, the OSS database, containing information as, for instance, area codes, connection IDs, etc., may be already in place and operated by the telecommunication service provider for other purposes. This database 78 assists in identifying the proper admission control modules 74 associated with the user request, as explained more fully below. Together the OSS DB and the local topology databases form an information base upon which admission control decisions can be made.

Using the two-tier hierarchical architecture for the admission control portion 46 allows the coordinator module 70 to remain ignorant of the details (links, devices, interconnections, etc.) of the access networks or the backbone network Instead, the AC coordinator module 70 selects the admission control subsystems involved in the user request and forwards the findings to the other modules of the QoS system (i.e., Mapping and Enforcement). The two-tier approach provides a simple way to maintain and update changes to the access and backbone networks by allowing separate admission control modules 74 to monitor each network. Additionally, the solution allows the subsystem modules to monitor networks that use different protocols and different vendor-specific equipment (e.g., routers, switches, etc.).

The two-tier approach is readily scalable as additional admission control subsystems can be easily added for new access networks. Scalability is further achieved because each admission control subsystem needs only to monitor one access network or one backbone network. Note also that a particular area does not always require an associated AC subsystem, for instance when network resources are over provisioned.

Figure 4:
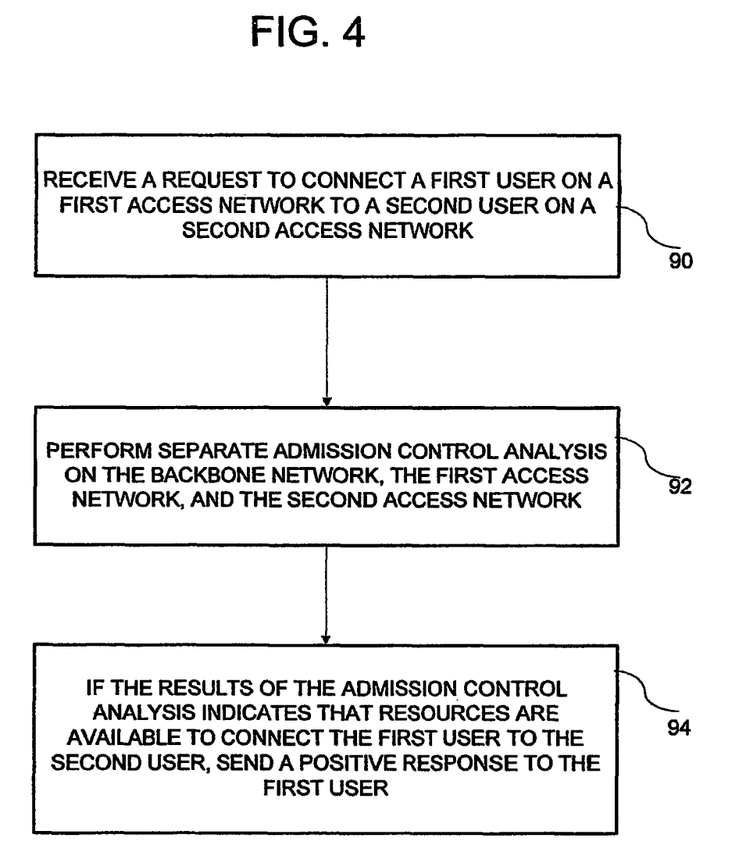
FIG. 4 is a flowchart of a method for managing QoS requests using the quality server of FIGS. 2 and 3.

FIG. 4 shows a flowchart for performing admission control using the quality server 42 of FIGS. 2 and 3. In process block 90, the quality server 42 receives a request from a first user on a first access network, for example user A in Access Network 16, such request asking for connection to a second user on a second access network, for example user B in Access. Network 14. As previously explained, the request may be made directly to the quality server 42 or through intermediate elements. A request generally includes the IP addresses of both the first and second users. In process block 92, admission control analysis is separately performed on the backbone network, and the first and second access networks. Thus, individual analysis is performed on each of these networks to determine if adequate resources are available for the user's request. In process block 94, if each analysis indicates that adequate resources are available, then a positive response is returned to the user and the enforcement module 48 is activated. Obviously, if resources are not available the user will receive a negative response and the resources allocated by the other subsystems are de-allocated.

Figure 5:
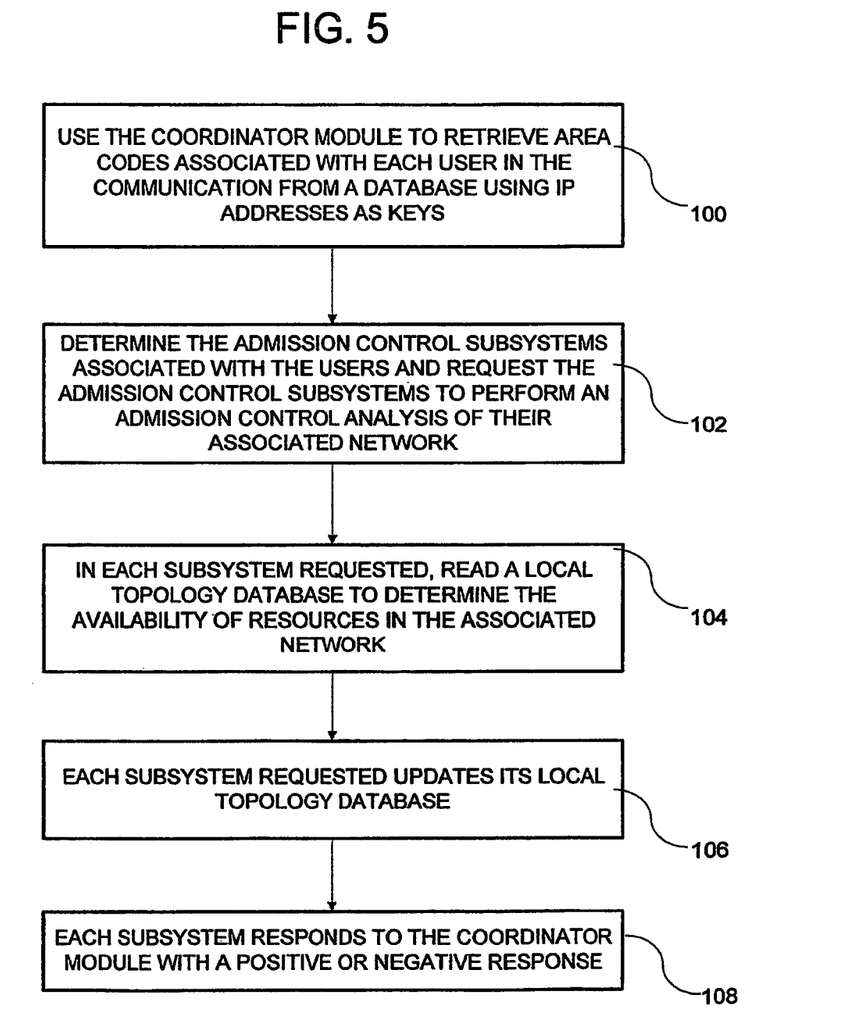
FIG. 5 is a more detailed flowchart of the admission control analysis of FIG. 4.

FIG. 5 is a flowchart providing further details of the method. In process block 100, the coordinator module 70 uses, in a first phase, the IP addresses received in the request (step 90 of FIG. 4) as input keys to the OSS database 78 to read area codes (and therefore the network areas) and connection IDs associated with the first and second users. The Connection IDs represent the actual identification assigned by the system to the client's logical link within the context of the access area considered and permits information regarding the resources associated with it to be traced. In process block 102 the coordinator module 70 processes the two area codes received and determines how many and which AC subsystem modules 74 to contact for carrying out the availability checks of the resources.

An example algorithmic structure in which n access areas are connected by a single backbone, could be as follows wherein the users are in area codes j and k:

If AREACODEj<> AREACODEk→Subsystems ACj, ACk and also ACbb are contacted.

If AREACODEj=AREACODEk→The users involved in the request reside in the same access area and the backbone is not traversed, hence the only subsystem contacted is ACj (=ACk)

Obviously, a different structure from the example given could employ different selection algorithms. Once the AC subsystem modules 74 have been identified, the AC coordinator module 70 contacts them (in parallel, if needed, to optimize times) communicating the Connection IDs obtained in response from the OSS database 78. The coordinator module 70 then waits for a resource availability response. In process block 104, each single AC subsystem module 74 carries out the checks, in a second phase, by reading from its own local topology database 76, using the Connection ID as a key. From this reading, the AC subsystem module receives the individual links forming the user's logical connection and the status of the resources of each one of them. In process block 106, the AC subsystem module updates the status of its own resources in its area. Then the AC subsystem module sends a response (negative or positive) to the coordinator module 70 (process block 108). As previously mentioned, a positive result from each AC subsystem module will result in a positive response to the user and activation of the enforcement module 48.

Figure 6:
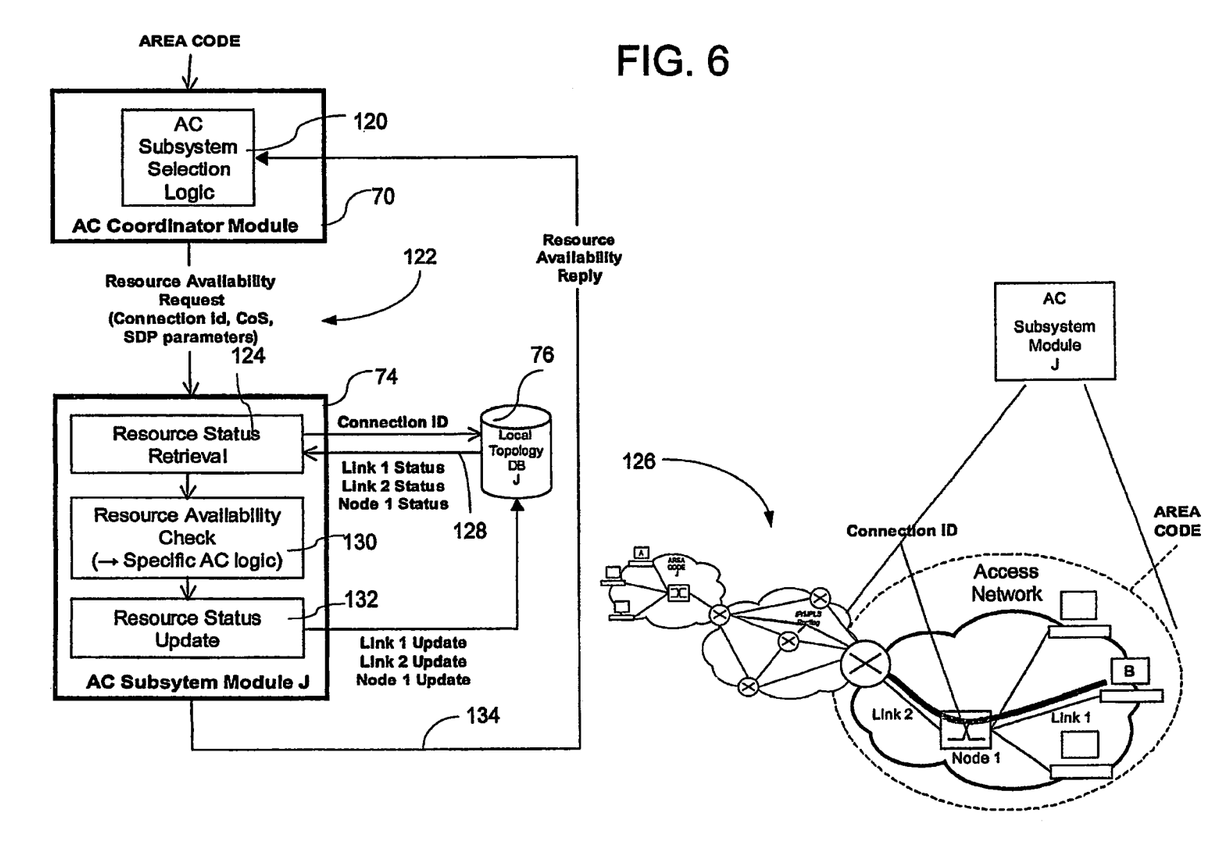
FIG. 6 is a combined flowchart and system diagram illustrating the interaction between the coordinator module and one of the admission control subsystem modules monitoring an access network.

FIG. 6 is a diagram that further details the interaction between the admission control coordinator module 70 and the admission control subsystem 72, and further expands on process block 104 of FIG. 5. For managing the access areas, each assigned AC subsystem module 74 has access to its own respective local topology database 76 containing detailed topological information on the access area to which it is assigned. The structure of the database 76 can be such that it models the architecture of the access area. Consequently, each different type of access area generally results in a different structure. For example, an AC subsystem module assigned to an access area using MAN-GBE technology will have a database whose structure differs from the database of an AC subsystem module assigned to an access area using xDSL technology. The AC coordinator module 70 includes an AC subsystem selection logic 120 that uses the IP addresses of the user to determine which AC subsystem modules to contact. Once the AC subsystem modules are selected, the AC coordinator module 70 sends to the selected modules the relevant parameters of the Resource Availability Request: Connection ID, CoS (class-of-service) and QoS Parameters (e.g., SDP), as shown at 122. Each selected AC subsystem module 74 receives these parameters (including the connection identifier) and then uses these input parameters to determine what are the network resources (generically schematized as "nodes" and "links") that will be analyzed and possibly reserved by the request. In process block 124, a "resource status retrieval" is performed wherein the Connection ID (initially extracted from the OSS database 78) is used to access the topology database 76. The connection ID allows the identification of the connection resources being physically provided to the user, such as shown by Link1-Node1-Link2 at 126. Additionally, the status of a single connection resource (Link1, Node1, and Link2) can be obtained based on the input data. An example of data obtained about a resource could be the total bandwidth (allocated and available) for the links. It should be noted that the local topology database 76 can be manually or, in the case where the technology available in the access area permits, automatically populated. In the manual case, it could be network operators who undertake the operation, in both the creation of the access infrastructure and in the connection of a certain user. At this point, with the information at hand, it is possible to determine whether adequate resources are available to satisfy the user request in a "Resource Availability Check" phase shown at 130. It should be noted that this logic can be significantly specialized according to specific needs and that, in any case, its customized implementation does not affect the described architecture.

If the "Resource Availability Check" phase 130 is successful, the status of the resources involved, stored in the local topology database 76, is updated in the "Resource Status Update" phase shown at 132 and, whatever the outcome, a final response is given to the AC Coordinator Module as shown at 134.

Figure 7:
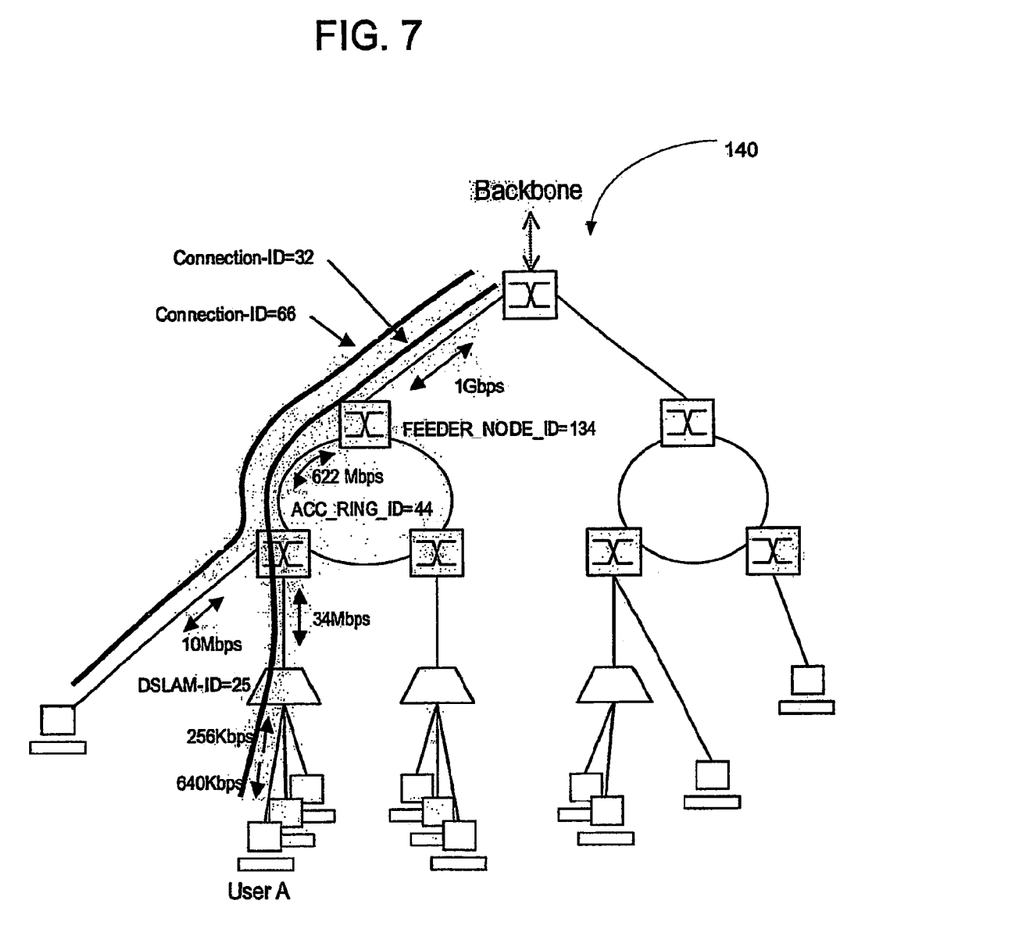
FIG. 7 is a specific example showing users on an access network connected to the backbone network.
Figure 8:
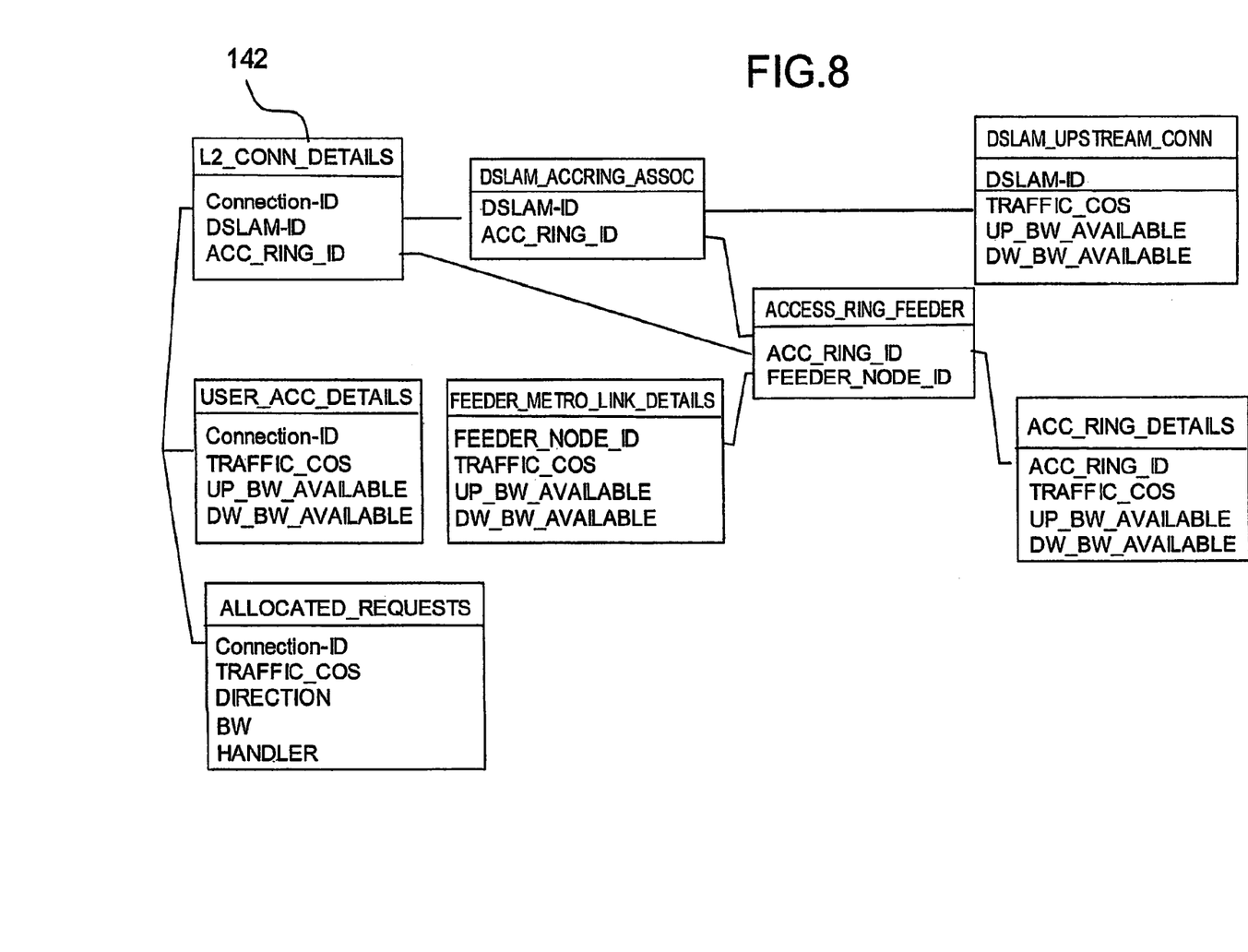
FIG. 8 shows a logical structure of a database used by an admission control subsystem module that monitors the access network of FIG. 7.

FIGS. 7, 8, and 9 are illustrated for an example of showing a possible structure of a local topology database. Given a structure of an access network 140 as shown in FIG. 7, a corresponding logical structure for the local topology database 76 is shown in FIG. 8. FIG. 8 includes a series of tables represented by boxes, such as shown at 142. Each box includes the subject of the table and columns of information available in the table. For example, box 142 relates to a table of the connection details for users A and B (see FIG. 7). The table includes the fields of the "Connection ID", "DSLAM ID" and "ACC Ring ID".

Figure 9:
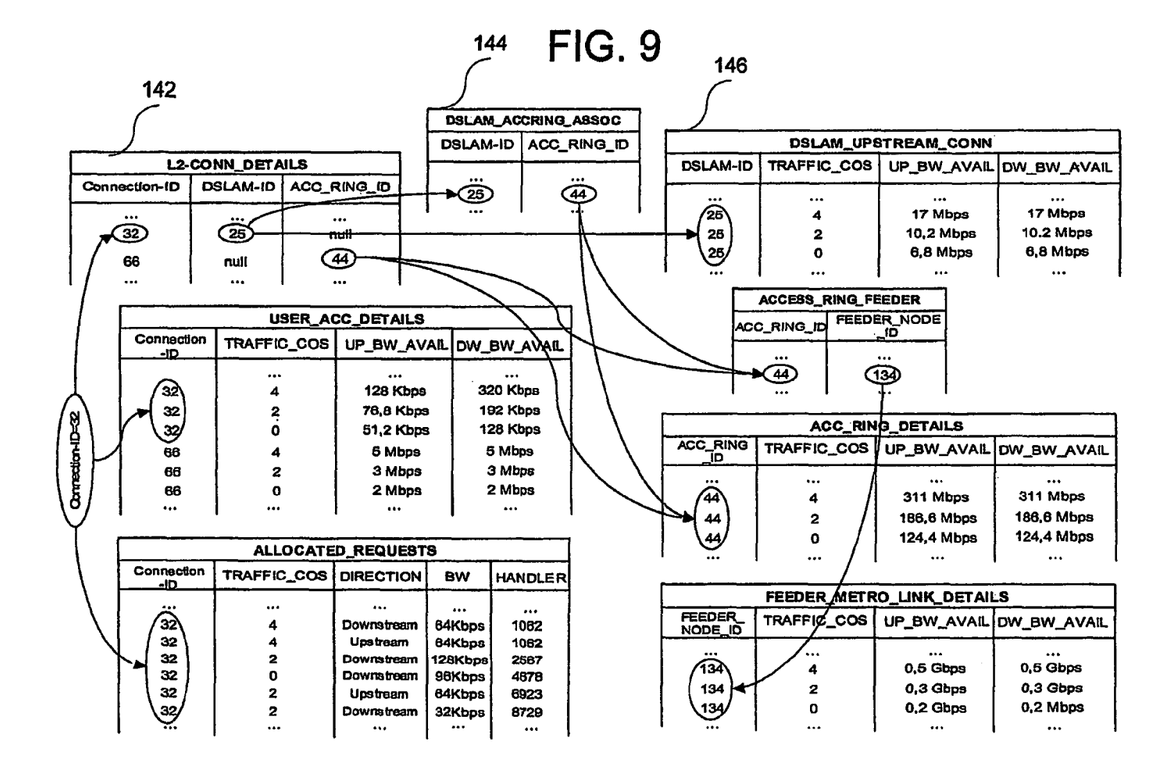
FIG. 9 shows further details of the database of FIG. 8 with corresponding database tables populated.

FIG. 9 shows an example of how to populate fields of the tables. For example, the table 142 from FIG. 8 is shown in detail in FIG. 9. The tables together form a relational database so that one column in table 142 has information used to access other tables. For example, the DSLAM-ID in the second column of table 142 can be used as a key to access tables 144 and 146.

The objective of the local topology databases 76 is to provide the topological details (links, available/allocated bandwidth, etc.) relative to the connection for which the admission control operation has been requested. The connection ID is used as the access key from which all other associated information may be obtained.

From FIGS. 7, 8, and 9, it is evident that the local topology databases 76 are specific to the type of network to which they relate. Thus, different access networks that are based on different technologies or different vendors can have a different structure for their relational databases.

Figure 10:
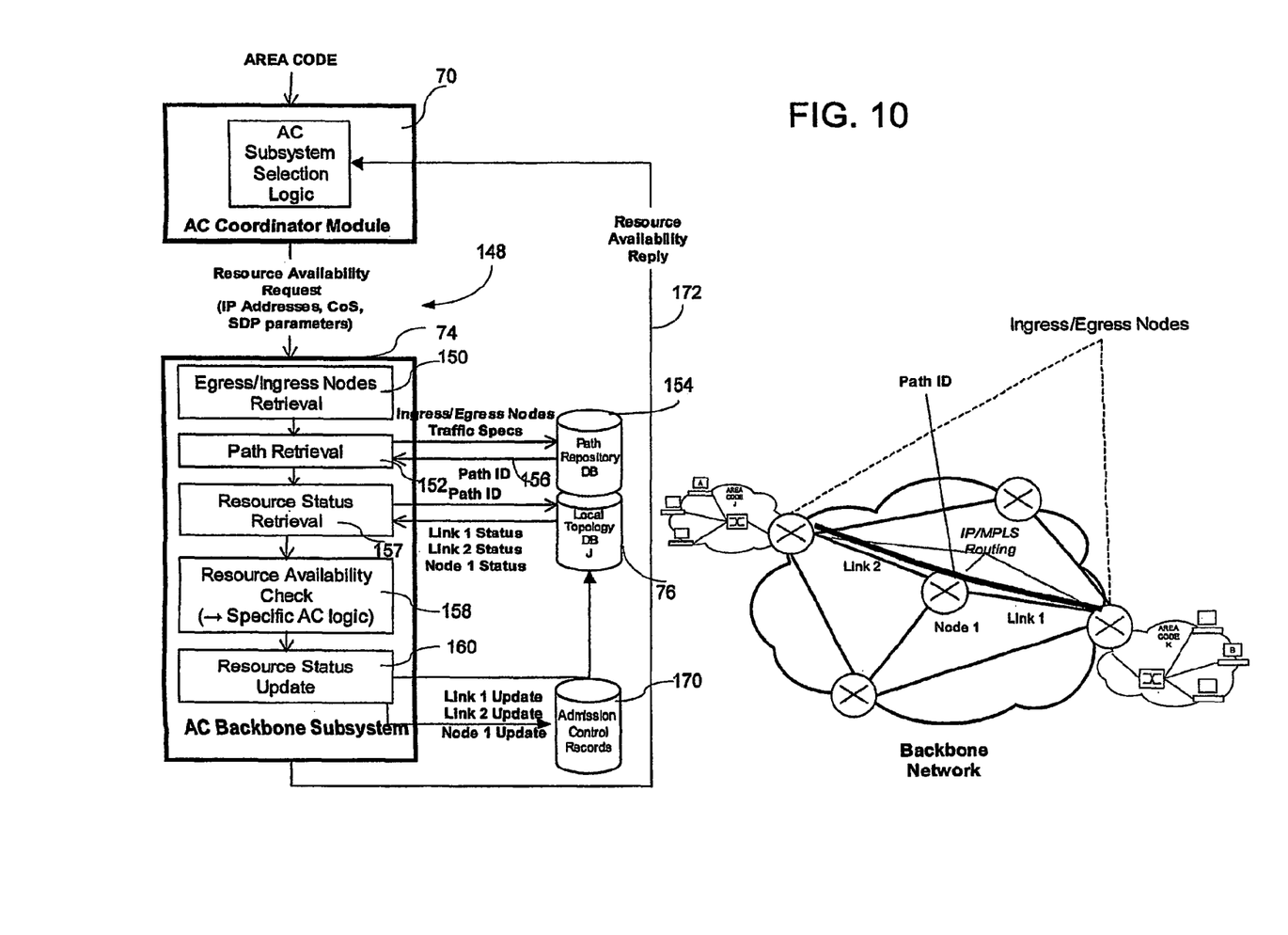
FIG. 10 shows a combined flowchart and system diagram illustrating the interaction between the coordinator module and one of the admission control subsystem modules monitoring the backbone network.

FIG. 10 shows further details of how the AC coordinator module 70 interacts with an admission control subsystem module 74 in charge of monitoring the backbone network 12. The admission control functions inside a backbone based on DIFFSERV/MPLS-TE mixed technologies pose different complications with respect to the case of access areas.

As shown at 148, a Resource Availability Request is made from the coordinator module 70 that specifies the network end-points (for example, in terms of IP addresses of the hosts that originate and terminate the end-to-end section), in addition to other information on the requested level of quality that characterizes the flow.

As shown at process block 150, with the end-points identified, the backbone admission control module 74 determines the access points to the backbone (i.e., the edge routers). This phase, known as "Egress/Ingress Nodes Retrieval", can be performed on the basis of the routing information present on the backbone. With the backbone access points identified, a Path Repository 154 is interrogated at process block 152 with a request including the characteristics that define the flow. On the basis of this information, the Path Repository 154 determines the traffic aggregate (logical network routing flow—in conformity with MPLS logic) to which the individual flow in question must belong, returning a Path-ID as shown at 156. This phase is known as "Path Retrieval".

The Path-ID is the functional equivalent for the backbone of the previously illustrated Connection-ID for access areas: on the basis of the Path-ID, the Local Topology DB is thus able to identify the set of network resources involved. It is possible to think of the Path Repository 154 as containing all the information regarding the various routing paths. For example, the following information could be maintained for each path:

Path-ID: identifier for the network path.

Source and Destination PE-ID (Provider Edge—Identifier): identifiers of the end-points (source and destination) for the path.

Source and Destination IP Networks: source and destination networks for the flow.

VPN (Virtual Private Network)-Customer ID: Identifier of the customer VPN for which the path is reserved.

Traffic CoS (Class-of-Service): traffic service class to which the path is applied.

If the use of a given path is not restricted to a specific attribute (CoS value or destination IP network, for example), this attribute will not be set in the Paths Repository (or it could contain a default/don't care value). It should be noted that the Path Repository 154 could have more than one path (Path ID) for a given pair of Ingress/Egress PEs. The selection of the most suitable Path ID takes place, for example, on the basis of other flow characteristics (e.g. VPN ID, Traffic CoS, etc.).

The information that populates the Path Repository 154 can derive from specific dedicated elements, such as, for example, a Path Discovery Module (not shown) for paths determined by basic IGP routing (hop-by-hop MPLS LSP) and/or by a Path Computation Server for paths created ad hoc (MPLS-TE) by the operator for transporting special categories of traffic. Moreover the Path Repository uses the same representation for modelling both the basic. IGP routing paths and MPLS-TE tunnels, allowing to treat both types of resources in the same manner from the quality server operation point of view. The Path Discovery Module is delegated to the automatic discovery of MPLS end-to-end (PE-to-PE) paths determined by basic IGP routing (Hop-by-Hop MPLS LSP). A Path Computation Server (not shown) is instead delegated to calculating the MPLS-TE tunnels that satisfy certain restrictions and optimization criteria defined by the Service Provider. Note that relying on a centralized Path Computation function makes it easier to take into account MPLS-TE tunnels created for different purposes and not directly managed by the quality server, thus assuring that the coherency in the view of network resources is always maintained.

At process block 157, once the flow path (Path ID) is known, the network resources (and their status) are identified that are used to form the path ("Resource Status Retrieval" phase). To this end, the admission control module 74 relies on the local topology database 76. From the conceptual viewpoint, similarly to the access areas case, the local topology database 76 should be capable of supplying this information.

It should be noted that from the practical viewpoint, also in the case of the backbone, the local topology database 76 can be populated both manually and automatically, using appropriate automatic discovery probes. Nevertheless, unlike the access areas, it may be noted that the backbone (being IPbased and having dynamic routing in many cases) presents more favorable conditions for implementing automatic discovery.

In process block 158, having also retrieved the status of the individual resources for the backbone, a phase is contemplated where specific logic for flow admission is applied (the "Resource Availability Check" phase). If the admissibility check is passed, the Admission Control module updates the local topology database at process block 160 to maintain alignment of the network status information ("Resource Status Update" phase). For each link of which the path is composed, the admission control module 74 should, for example, increment the Allocated Bandwidth value for the service class to which the flow considered admissible belongs.

A further database shown at 170 includes "Admission Control Records", for facilitating de-allocation operations (or reallocation in the case of rerouting) on resources relative to individual flows. This database 170 permits keeping trace of the processed (and admitted) request and the resources associated with it. The Admission Control Record should allow all information relative to the flow to be traced and, in particular, the Path-ID on which the flow has been considered admissible (obtained from the Path Repository interrogation). This allows more efficient and simple reprocessing, on an aggregate basis, of the Admission Control Records associated with the various flows that have been considered admissible in case of rerouting events. It should be noted that such a database could also be present for operations carried out in the access areas, it being understood that rerouting events are more likely in the case of the backbone and the complexity of operations of this type is much greater on the backbone where any rerouting would impact the entire traffic aggregate (thereby forcing the reallocation of all N micro-flows).

After the availability of resources on the backbone network has been identified, a reply is sent back to the AC coordinator module 70 indicating whether the user request can be satisfied or not (arrow 172).

Figure 11:
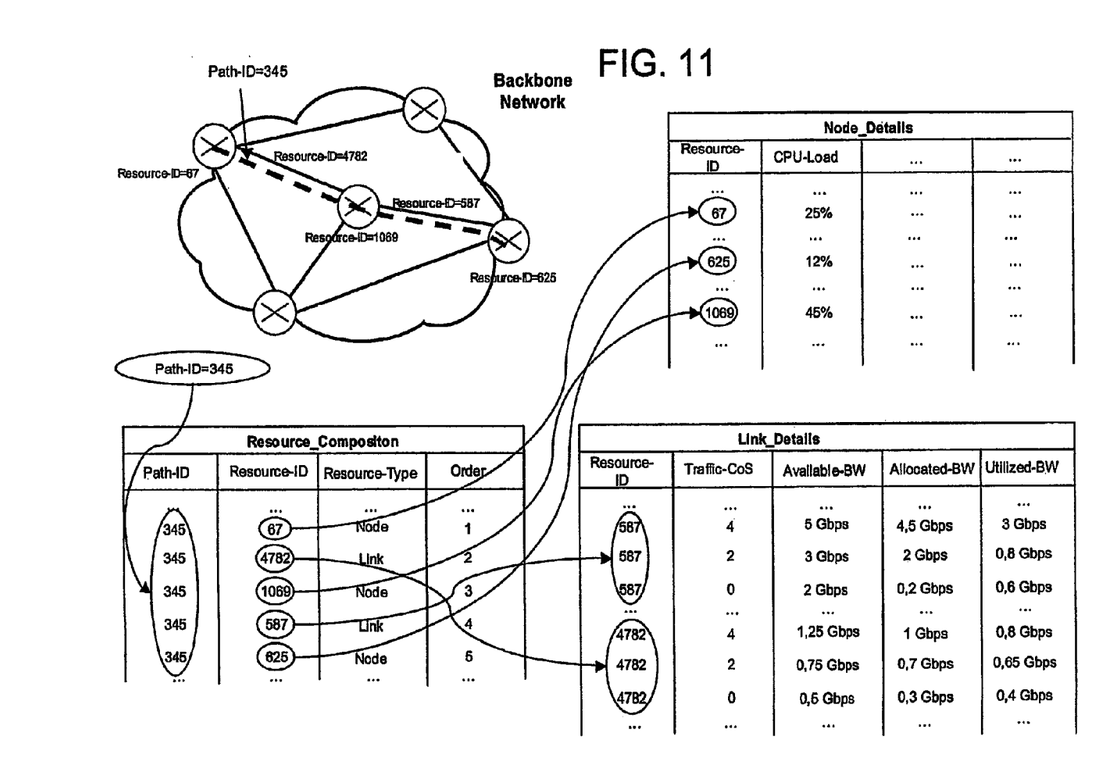
FIG. 11 shows a database used by the admission control subsystem module of FIG. 10.

An example of a local topology database structure for the backbone is shown in FIG. 11. Note that, in dealing with a backbone, the tables contain information more oriented to the entire traffic aggregate (unlike the access area, where information is more oriented to the individual flow). For example, information is maintained on the total allocated bandwidth (LINK_DETAILS) for each backbone link, while in the access areas this information is obtained dynamically in the Admission Control phase as the sum of the individual allocations (ALLOCATED_REQUESTS).

It is clear that numerous modifications and variants can be made to the present invention, all falling within the scope of the invention, as defined in the appended claims.

The invention claimed is:

1. A method of performing admission control in a packet-based telecommunication network including a backbone network coupled between at least first and second access networks using different transmission protocols and technologies; and an admission control system with a hierarchically-structured admission control architecture including admission control subsystem modules each associated with and configured to monitor a respective one of the backbone network and the first and second access networks, and an admission control coordinator module coupled with and configured to control the admission control subsystem modules, the method comprising:

receiving at the admission control coordinator module a request from a first user of the first access network to connect with a second user of the second access network;

determining at the admission control coordinator module the admission control subsystem modules associated with the first and second access networks; and requesting by the admission control coordinator module to the admission control subsystem modules associated with the first and second access networks and, if the first and second access networks are separate access networks, to the admission control subsystem module associated with the backbone network, to check availability of connection resources of each respective network for establishing a connection between the first and second users.

2. The method of claim 1, wherein the admission control system further includes a hierarchically-structured information base including an area code database associated with the admission control coordinator module and local topology databases each associated with a respective admission control subsystem module and adapted to store information regarding connection resources available in the respective network, wherein determining at the admission control coordinator module the admission control subsystem modules associated with the first and second access networks comprises accessing the area code database; and wherein checking at the admission control subsystem modules availability of connection resources includes accessing the local topology databases.

3. The method of claim 2, wherein determining at the admission control coordinator module the admission control subsystem modules associated with the first and second access networks comprises:

accessing the area code database to identify the first and second access networks by using IP addresses of the first and second users; and receiving the area codes for the first and second users from the area code database; and determining the admission control subsystem modules associated with the first and second access networks based on the area codes.

4. The method of claim 2, wherein checking at the admission control subsystem modules availability of connection resources comprises:

sending to the local topology databases associated with the first and second access networks a connection identifier associated with the first and second users;

using the connection identifier to access the local topology databases; and determining from information received from the local topology databases whether connection resources are available.

5. The method of claim 1, wherein the admission control system further includes a path repository database, the method further comprising:

determining at the admission control subsystem modules associated with the backbone network a path through which a communication can pass in the backbone network by interrogating the path repository database.

6. The method of claim 1, wherein the admission control system further includes an enforcement module, the method further comprising:

if connection resources are available, requesting by the admission control coordinator module the enforcement module to configure the backbone network and the first and second access networks for establishing the connection.

7. The method of claim 6, comprising establishing the connection by using IP and both MPLS and MPLS-TE at the same time.

8. The method of claim 1, wherein the first and second access networks are the same network.

9. A system for performing admission control in a packet-based telecommunication network including a backbone network coupled between at least first and second access networks using different transmission protocols and technologies, the admission control system comprising:
a hierarchically-structured admission control architecture including admission control subsystem modules each associated with and configured to monitor a respective one of the backbone network and the first and second access networks, and an admission control coordinator module coupled with and configured to control the admission control subsystem modules the admission control coordinator module being further configured to:
receive a request from a first user of the first access network to connect to a second user of the second access network;
determine the admission control subsystem modules associated with the first and second access networks; and
request the admission control subsystem modules associated with the first and second access networks and, if the first and second access networks are separate access networks, the admission control subsystem module associated with the backbone network, to check availability of connection resources of each respective network for establishing a connection between the first and the second users.

10. The system of claim 9, further comprising:
a hierarchically-structured information base including an area code database associated with the admission control coordinator module and local topology databases each associated with a respective admission control subsystem module and adapted to store information regarding connection resources available in the respective network
wherein the admission control coordinator module is further configured to determine the admission control subsystem modules associated with the first and second access networks by accessing the area code database, and
wherein the admission control subsystem modules are further configured to check availability of connection resources by accessing the respective local topology databases.

11. The system of claim 9, wherein the admission control coordinator module is configured to determine the admission control subsystem modules associated with the first and second access networks by:
accessing the area code database to identify the first and second access networks by using IP addresses of the first and second users;
receiving the area codes for the first and second users from the area code database; and
determining the admission control subsystem modules associated with the first and second access networks based on the area codes.

12. The system of claim 9, wherein the admission control subsystem modules are configured to check availability of connection resources by:
sending to the local topology databases associated with the first and second access networks a connection identifier associated with the first and second users;
using the connection identifier to access the local topology databases; and
determining from information received from the local topology databases whether connection resources are available.

13. The system of claim 9, further comprising:
a path repository database;
and wherein the admission control subsystem module associated with the backbone network is configured to determine a path through which a communication can pass in the backbone network by interrogating the path repository database.

14. The system of claim 9, further comprising:
an enforcement module;
and wherein the admission control coordinator module is further configured to request, if connection resources are available, the enforcement module to configure the backbone network and the first and second access networks for establishing said connection.

15. The system of claim 14, wherein the connection is established by using IP and both MPLS and MPLS-TE at the same time.

16. The system of claim 9, wherein the first and second access networks are the same network.

\* \* \* \* \*